United States Patent
Zseng

(10) Patent No.: US 10,422,966 B2
(45) Date of Patent: Sep. 24, 2019

(54) OPTICAL FIBER CONNECTION SYSTEM

(71) Applicant: Oplink Communications, LLC, Fremont, CA (US)

(72) Inventor: Fan-Chen Zseng, Taipei (TW)

(73) Assignee: Molex, LLC, Lisle, IL (US)

(*) Notice: Subject to any disclaimer, the term of this patent is extended or adjusted under 35 U.S.C. 154(b) by 0 days.

(21) Appl. No.: 15/897,237

(22) Filed: Feb. 15, 2018

(65) Prior Publication Data

US 2018/0231722 A1 Aug. 16, 2018

(30) Foreign Application Priority Data

Feb. 16, 2017 (CN) .................... 2017 2 0139031 U

(51) Int. Cl.
*G02B 6/38* (2006.01)
*G02B 6/00* (2006.01)

(52) U.S. Cl.
CPC ........... *G02B 6/3893* (2013.01); *G02B 6/387* (2013.01); *G02B 6/3825* (2013.01); *G02B 6/3831* (2013.01); *G02B 6/3879* (2013.01); *G02B 6/3887* (2013.01); *G02B 6/3897* (2013.01); *G02B 6/3821* (2013.01); *G02B 6/3874* (2013.01); *G02B 6/3894* (2013.01)

(58) Field of Classification Search
CPC ........ G02B 6/38; G02B 6/387; G02B 6/3893; G02B 6/00
USPC ......................................................... 385/60
See application file for complete search history.

(56) References Cited

U.S. PATENT DOCUMENTS

| | | | | | |
|---|---|---|---|---|---|
| 5,073,042 A | * | 12/1991 | Mulholland | ......... | G02B 6/3825 385/56 |
| 5,231,685 A | * | 7/1993 | Hanzawa | ............. | G02B 6/4292 385/139 |
| 5,481,634 A | * | 1/1996 | Anderson | ............ | G02B 6/3893 385/55 |
| 5,548,677 A | * | 8/1996 | Kakii | ..................... | G02B 6/262 385/55 |

(Continued)

FOREIGN PATENT DOCUMENTS

CN 203259689 U 10/2013

Primary Examiner — Kaveh C Kianni
(74) Attorney, Agent, or Firm — Molex, LLC

(57) ABSTRACT

The present disclosure provides an optical fiber receptacle, an optical fiber connection device and an optical fiber receptacle module. The optical fiber receptacle comprises a housing, a plurality of positioning hooks and at least one clamping unit. The housing has a rear wall, and at least one slot opened on an opposite side of the rear wall. The rear wall has an inner surface facing the slot and an outer surface opposite to the inner surface, the slot is used to be inserted by an optical fiber plug. The positioning hook protrudes from the outer surface of the rear wall in a column shape, is used to pass through a mounting hole of a panel to latched with a hole edge defining the mounting hole of the panel. The clamping unit is formed to the rear wall corresponding to the slot and comprises a clamping channel penetrating the rear wall and communicated with the corresponding slot for clamping a holding member of the optical fiber joint so that the first ferrule of the optical fiber plug and the second ferrule of the optical fiber joint are connected relative to each other. The optical fiber receptacle of the present disclosure can reduce the volume and greatly reduce the material costs.

13 Claims, 19 Drawing Sheets

(56) References Cited

U.S. PATENT DOCUMENTS

| | | | | |
|---|---|---|---|---|
| 5,719,977 A * | 2/1998 | Lampert | G02B 6/3831 | 385/60 |
| 5,774,611 A * | 6/1998 | Nagase | G02B 6/3825 | 385/58 |
| 6,439,780 B1 * | 8/2002 | Mudd | G02B 6/3807 | 385/83 |
| 6,910,812 B2 * | 6/2005 | Pommer | G02B 6/4201 | 257/200 |
| 7,137,742 B2 * | 11/2006 | Theuerkorn | G02B 6/3831 | 385/53 |
| 7,146,090 B2 * | 12/2006 | Vo | G02B 6/387 | 385/138 |
| 7,150,567 B1 * | 12/2006 | Luther | G02B 6/3851 | 385/78 |
| 7,184,634 B2 * | 2/2007 | Hurley | G02B 6/3887 | 385/100 |
| 7,244,066 B2 * | 7/2007 | Theuerkorn | G02B 6/3825 | 385/53 |
| 2004/0223701 A1 * | 11/2004 | Tanaka | G02B 6/3825 | 385/55 |
| 2005/0213892 A1 * | 9/2005 | Barnes | G02B 6/3806 | 385/62 |
| 2007/0025665 A1 * | 2/2007 | Dean, Jr. | G02B 6/3851 | 385/78 |
| 2009/0060423 A1 * | 3/2009 | Melton | G02B 6/4471 | 385/80 |
| 2009/0148101 A1 * | 6/2009 | Lu | G02B 6/3816 | 385/56 |
| 2009/0269014 A1 * | 10/2009 | Winberg | G02B 6/3846 | 385/78 |
| 2010/0316344 A1 * | 12/2010 | Bylander | G02B 6/3833 | 385/134 |
| 2010/0322576 A1 * | 12/2010 | Rhoney | G02B 6/4452 | 385/134 |
| 2011/0229085 A1 * | 9/2011 | Bradley | G02B 6/02042 | 385/78 |
| 2013/0259429 A1 * | 10/2013 | Czosnowski | G02B 6/3885 | 385/78 |
| 2014/0133807 A1 * | 5/2014 | Katoh | G02B 6/3821 | 385/78 |
| 2014/0286611 A1 * | 9/2014 | Pratt | G02B 6/3887 | 385/78 |
| 2015/0177463 A1 * | 6/2015 | Lee | G02B 6/3897 | 385/76 |
| 2015/0362681 A1 * | 12/2015 | Watte | G02B 6/3866 | 385/58 |
| 2017/0160496 A1 * | 6/2017 | de Jong | G02B 6/3893 | |
| 2017/0192180 A1 * | 7/2017 | Andrus | G02B 6/3847 | |

* cited by examiner

US 10,422,966 B2

OPTICAL FIBER CONNECTION SYSTEM

RELATED APPLICATIONS

This application claims priority to Chinese Application No. 201720139031.4, filed Feb. 16, 2017, which is incorporated herein by reference in its entirety.

TECHNICAL FIELD

The present disclosure relates to an optical fiber connection system, more specifically to an optical fiber receptacle, an optical fiber connection device, and an optical fiber receptacle module.

BACKGROUND ART

In a typical optical fiber connection system, the more components of a connector, the larger volume of a housing, and the higher the cost, therefore, simplifying the components and reducing the volume to reduce the cost is the development direction of the optical fiber connector. For example, Chinese Patent No. CN203259689U discloses a tail fiber assembly with a converter, which can save an additional converter. The tail fiber assembly comprises a converter provided with a mating hole therein, a connecting cylinder, one end of which is provided on the converter and communicated with the mating hole, a ceramic ferrule, and a connecting seat sheathing on the ceramic ferrule. A side part of the connecting seat is provided with a connecting key, a cylinder wall of the other end of the connecting cylinder is provided with a L-shaped snap slot to snap the connecting key. The ceramic ferrule passes through the connecting cylinder to be fixed in the mating hole.

The connecting seat and the connecting cylinder of the aforementioned patent are rotated relative to each other, so that the connecting key slides into a short part of the L-shaped snap slot and the connecting seat is fixed relative to the connecting cylinder. However, such a connecting method has the risk that the connecting key exit from the snap slot to make the connection between the connecting seat and the connecting cylinder loose and even the connecting seat and the connecting cylinder are detached because of vibration or rotation. In addition, two opposite sides of the converter of the aforementioned patent each extend outwardly to form a protruding outer edge with a screw hole for being mounted to the panel. However, when a plurality of converters are provided on the same panel, the protruding outer edges of the converters may increase a distance between adjacent converters and increases an occupied area, thereby reducing the number of converters that can be mounted on a single panel.

SUMMARY

Therefore, an object of the present disclosure is to provide an optical fiber receptacle with a small volume and which may stably clamp an optical fiber joint.

Another object of the present disclosure is to provide an optical fiber connection device.

Further another object of the present disclosure is to provide an optical fiber receptacle module.

Therefore, in some embodiments, an optical fiber connection system of the present disclosure comprises an optical fiber receptacle mounted to a panel having a mounting hole, an optical fiber plug; and an optical fiber joint. The optical fiber plug comprises a first ferrule, a first holding member holding the first ferrule, a base shell to which the first holding member is provided, an elastic piece provided to the base shell and abutting against the first holding member, and a sheathing shell sheathed on the base shell and covering the first holding member and making a part of the first ferrule protrude from the sheathing shell, the optical fiber joint comprises a second ferrule and a second holding member holding the second ferrule, the optical fiber receptacle comprises a housing, a plurality of positioning hooks and at least one clamping unit. The housing has a bottom wall, a top wall spaced apart from and facing the bottom wall, two side walls spaced apart from and facing each other and respectively connected to both sides of the bottom wall and the top wall, a rear wall connected to rear ends of the bottom wall, the top wall and the two side walls, and at least one slot opened on an opposite side of the rear wall, the rear wall has an inner surface facing the at least one slot and an outer surface opposite to the inner surface, the at least one slot is used to be inserted by the optical fiber plug. Each positioning hook has an elastic post protruding from the outer surface of the rear wall in a column shape and a hook portion formed to the elastic post, the positioning hook is used to pass through the mounting hole of the panel to latch with a hole edge defining the mounting hole of the panel. The at least one clamping unit is formed to the rear wall corresponding to the at least one slot, and the clamping unit comprises a clamping channel penetrating the rear wall and communicated with the corresponding slot for clamping the second holding member of the optical fiber joint to allow the second ferrule and the first ferrule to be connected relative to each other.

In some embodiments, the clamping unit further comprises a tubular body and a pair of clamping arms, the tubular body has an inner tube section protruding from the inner surface of the rear wall and extending into the slot and an outer tube section protruding from the outer surface of the rear wall, the pair of clamping arms extend from a distal end of the outer tube section, and each clamping arm has a latching hole.

In some embodiments, the clamping unit further comprises a sleeve provided in the tubular body to allow the first ferrule and the second ferrule to insert in and allow the first ferrule and the second ferrule to align with each other.

In some embodiments, the clamping unit further comprises a stopper portion provided in the clamping channel and between the pair of clamping arms and the outer tube section, the stopper portion is used to limit a position that the second ferrule extends into the housing.

In some embodiments, the stopper portion is a hollow annular block.

In some embodiments, an optical fiber connection device of the present disclosure comprises at least one optical fiber plug, at least one optical fiber joint and an optical fiber receptacle. The optical fiber plug comprises a first ferrule, a first holding member holding the first ferrule, a base shell to which the first holding member is provided, an elastic piece provided to the base shell and abutting against the first holding member, and a sheathing shell sheathed on the base shell and covering the first holding member and making a part of the first ferrule protrude from the sheathing shell. The optical fiber joint comprises a second ferrule and a second holding member holding the second ferrule. The optical fiber receptacle comprises a housing, a plurality of positioning hooks and at least one clamping unit. The housing has a bottom wall, a top wall spaced apart from and facing the bottom wall, two side walls spaced apart from and facing each other and respectively connected to both sides of the bottom wall and the top wall, a rear wall connected to rear ends of the bottom wall, the top wall and the two side walls, and at least one slot opened on an opposite side of the rear wall, the rear wall has an inner surface facing the at least one slot and an outer surface opposite to the inner surface, the at least one slot is used to be inserted by the at least one optical fiber plug respectively. Each positioning hook has an elastic post protruding from the outer surface of the rear wall in a column shape and a hook portion formed to the elastic post, the positioning hook is used to pass through a mounting hole of a panel to latch with a hole edge defining the mounting hole of the panel. The at least one clamping unit is formed to the rear wall corresponding to the at least one slot and correspondingly clamping the second holding member of the at least one optical fiber joint, and the clamping unit comprises a clamping channel penetrating the rear wall and communicated with the corresponding slot. The first ferrule and the second ferrule are connected relative to each other in the corresponding clamping channel.

In some embodiments, the clamping unit further comprises a tubular body and a pair of clamping arms, the tubular body has an inner tube section protruding from the inner surface of the rear wall and extending into the slot and an outer tube section protruding from the outer surface of the rear wall, the pair of clamping arms extend from a distal end of the outer tube section, and each clamping arm has a latching hole.

In some embodiments, the clamping unit further comprises a sleeve provided in the tubular body to allow the first ferrule and the second ferrule to insert in and allow the first ferrule and the second ferrule to align with each other.

In some embodiments, the clamping unit further comprises a stopper portion provided in the clamping channel and between the pair of clamping arms and the outer tube section, the stopper portion is used to limit a position that the second ferrule extends into the housing.

In some embodiments, the stopper portion is a hollow annular block.

In some embodiments, the second holding member is hollow tubular and has a second tube portion and a second stopping portion connected to one end of the second tube portion, and an outer diameter of the second stopping portion at a connecting position between the second stopping portion and the second tube portion is larger than an outer diameter of the second tube portion to form a second shoulder, the second stopping portion connects with the second ferrule, the second shoulder abuts against inner edges defining the latching holes of the corresponding pair of clamping arms.

In some embodiments, the second stopping portion is formed with a second tapered surface at a position away from a distal end of the second tube portion.

In some embodiments, the second stopping portion is polygonal column, and the second shoulder abuts against the inner edges defining the latching holes of the pair of clamping arms respectively at two corners of the second stopping portion In some embodiments, the optical fiber joint further comprises a sheath surrounding and covering the second holding member and a part of the second ferrule.

In some embodiments, the sheath further covers the pair of clamping arms.

In some embodiments, the base shell has a mounting portion in which the first holding member is inserted, the elastic piece is provided in the mounting portion and abuts against the first holding member, the sheathing shell is sheathed on the mounting portion and covers the first holding member and makes a part of the first ferrule protrude from one end of the sheathing shell.

In some embodiments, an optical fiber receptacle module of the present disclosure comprises an outer shell and a plurality of the optical fiber receptacles as previously mentioned. The outer shell comprises a panel, the panel is formed with a plurality of mounting holes arranged in a matrix. The plurality of the optical fiber receptacles are provided to the panel respectively corresponding to the mounting holes, outer side faces of the bottom wall and the two side walls of the housing of the each optical fiber receptacle all are flat surfaces, and so that the housings of the adjacent optical fiber receptacle are provided close to each other, the positioning hook of each optical fiber receptacle passes through the corresponding mounting hole and latches with a hole edge defining the mounting hole of the panel, and so that the outer surface of the rear wall faces towards an inside of the outer shell.

In some embodiments, the panel has a main body portion and a plurality of tab portions respectively protruding from the main body portion into the mounting holes, each tab portion is provided with a through hole, a screw hole is formed to the rear wall of the housing of each optical fiber receptacle to correspond to the through hole of the corresponding tab portion, a screw locking piece screws with the screw hole after passing through the through hole.

The present disclosure at least has the following beneficial effects: the optical fiber receptacle of the present disclosure can reduce the volume, and greatly reduce the material costs. And the optical fiber joint can greatly reduce the components, thereby not only saving the material costs, but also reducing the manufacturing hours. Furthermore, the plurality of optical fiber receptacles of the optical fiber receptacle module can be densely arranged on the panel, so as to greatly reduce the overall occupied area on the panel and increase the number of optical fiber receptacles provided on the panel, so that the optical fiber receptacle module can accommodate more optical fiber wires, thereby the number of signals that can transmitted by the optical fiber receptacle module is increased, and then the number of data center cabinets used to be provided with the optical fiber receptacle module can be reduced.

BRIEF DESCRIPTION OF THE DRAWINGS

The other features and effects of the present disclosure will be apparent in the detailed description in combination with the accompanying figures, and in which.

DETAILED DESCRIPTION OF THE PREFERRED EMBODIMENTS

Figure 1:
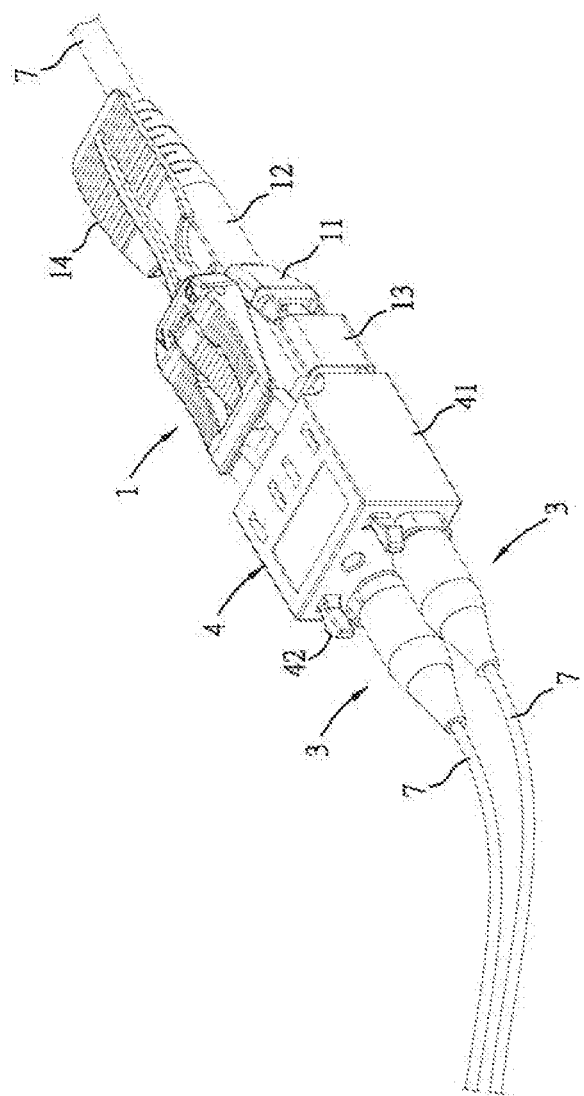
FIG. 1 is a perspective view of an embodiment of an optical fiber connection device of the present disclosure.
Figure 2:
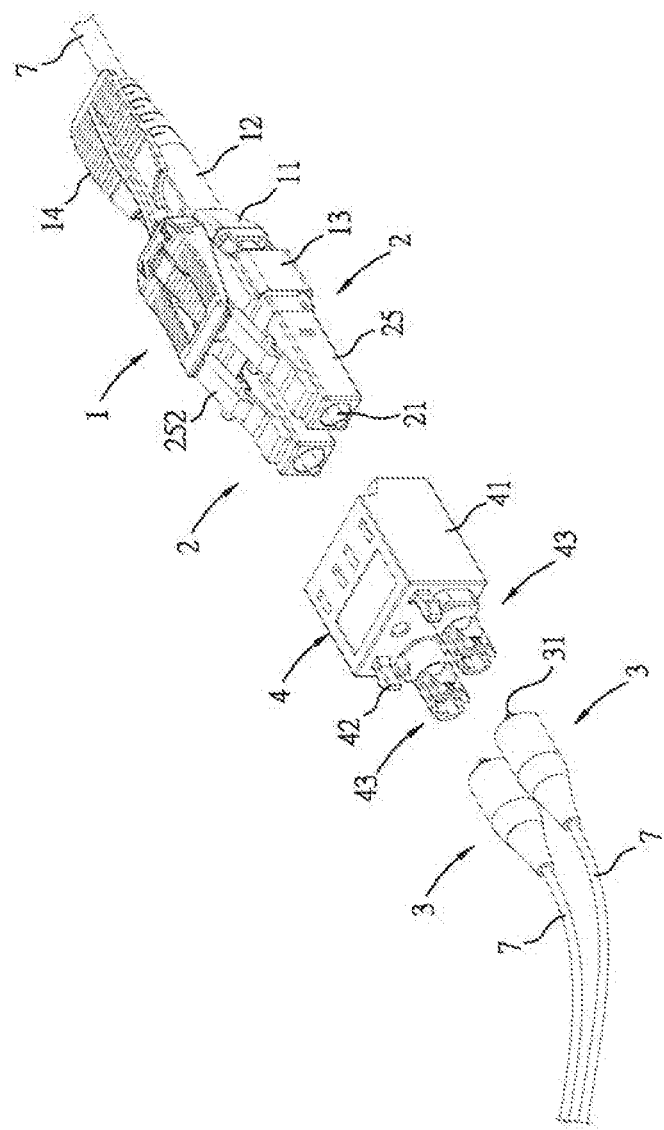
FIG. 2 is an exploded perspective view of the embodiment.
Figure 3:
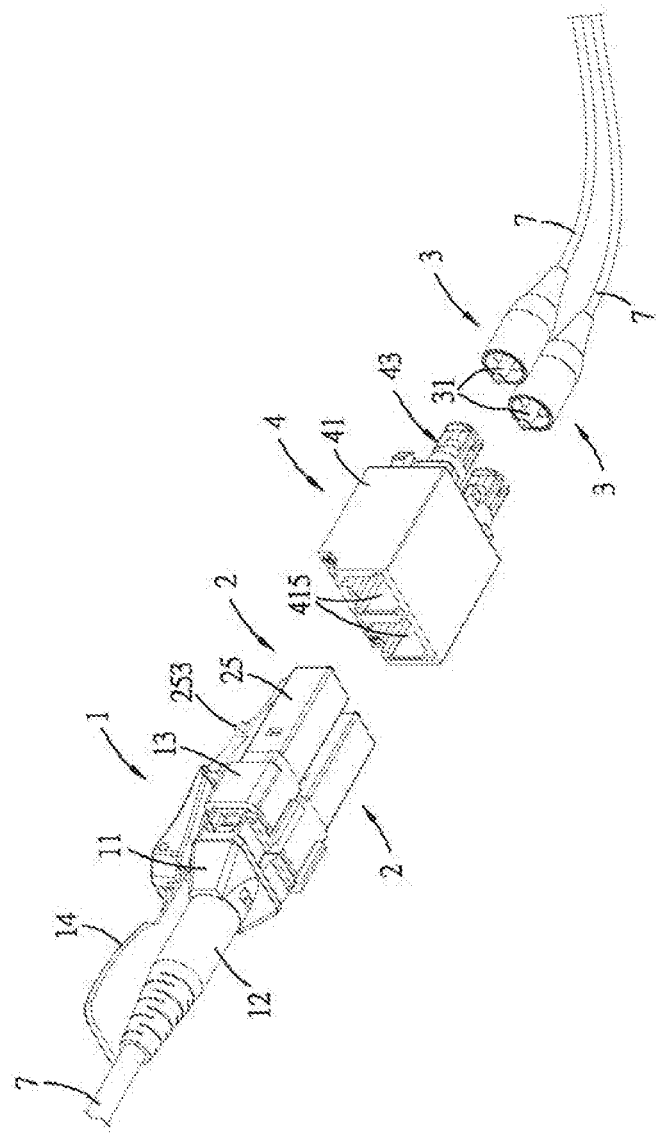
FIG. 3 is a view of FIG. 2 from another angle.
Figure 4:
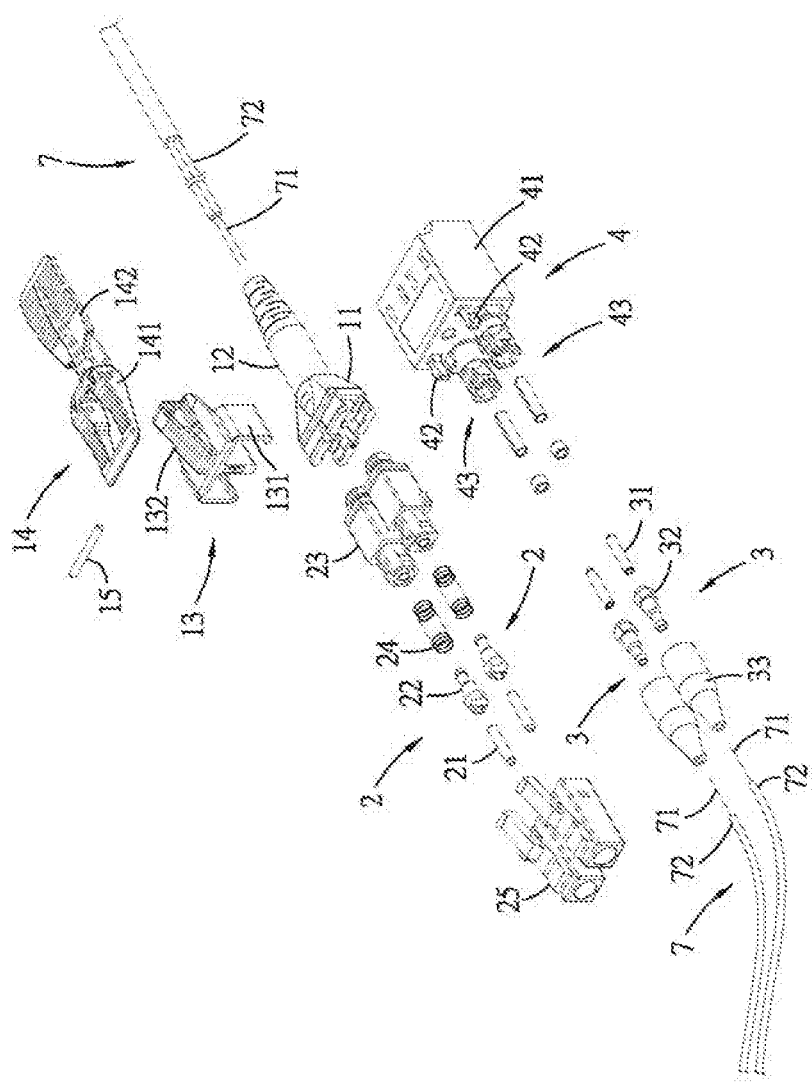
FIG. 4 is a further exploded perspective view of the embodiment.
Figure 5:
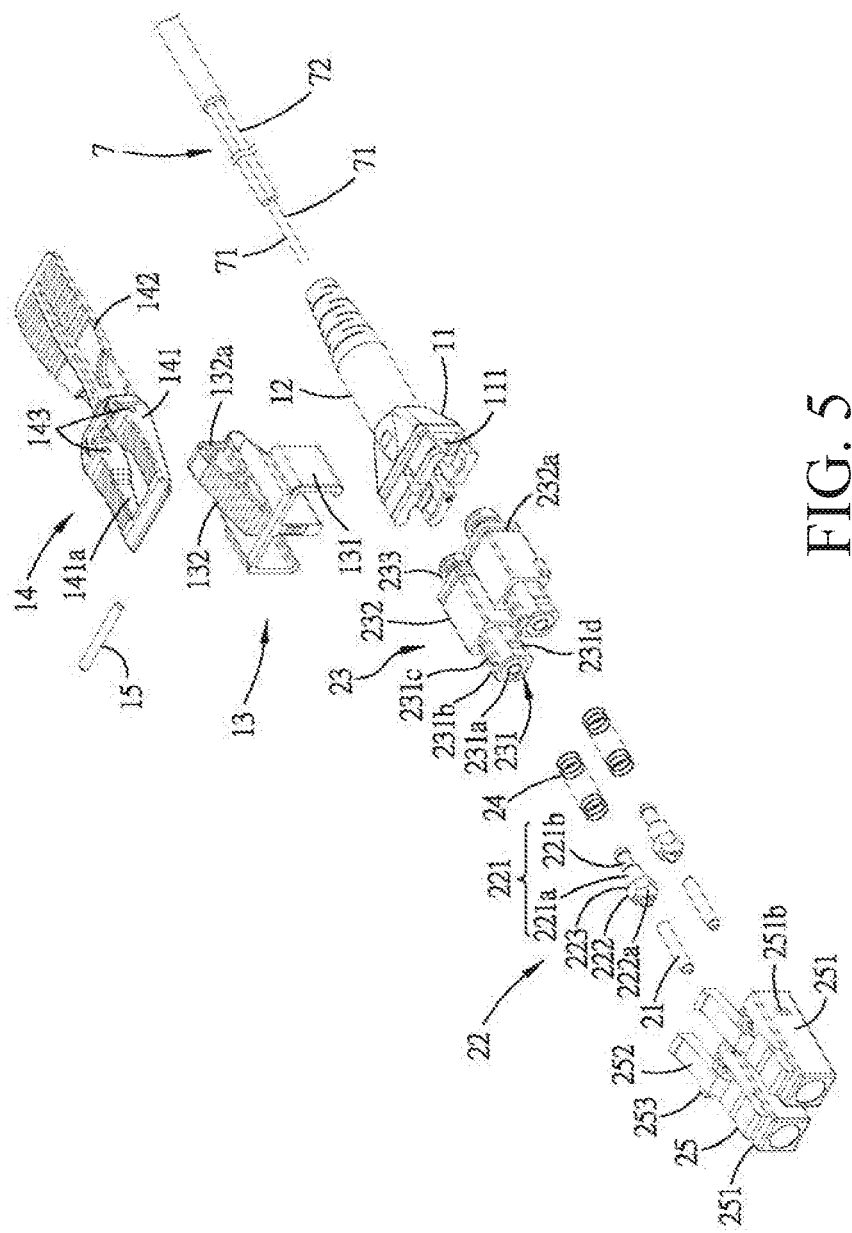
FIG. 5 is an enlarged view of an optical fiber connector of the embodiment in FIG. 4.
Figure 6:
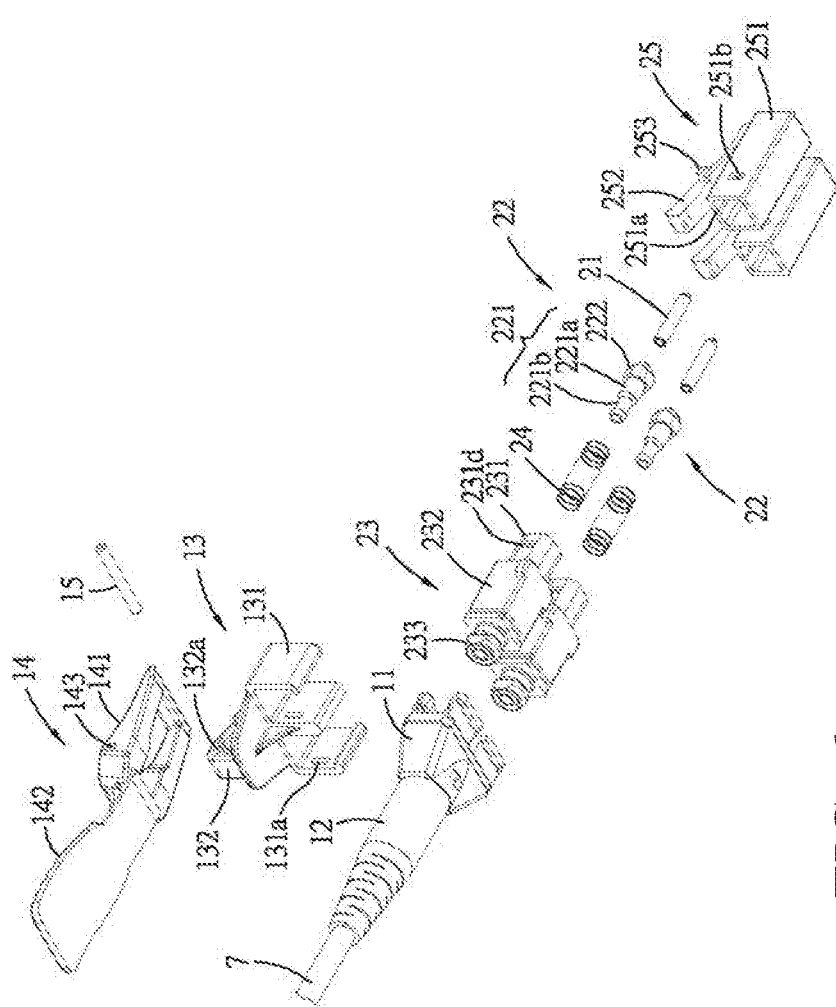
FIG. 6 is a view of FIG. 5 from another angle.

Referring to FIG. 1 to FIG. 3, an embodiment of an optical fiber connection device of the present disclosure comprises an optical fiber connector 1, two optical fiber joints 3 and an optical fiber receptacle 4. The optical fiber connector 1 comprises two optical fiber plugs 2 to respectively connect with the two optical fiber joints 3.

Referring to FIG. 4 to FIG. 6 and FIG. 9, each optical fiber plug 2 comprises a first ferrule 21, a first holding member 22 holding the first ferrule 21, a base shell 23, an elastic piece 24 and a sheathing shell 25. The first holding member 22 is hollow tubular and has a first tube portion 221 and a first stopping portion 222 connected to one end of the first tube portion 221, and an outer diameter of the first stopping portion 222 at a connecting position between the first stopping portion 222 and the first tube portion 221 is larger than an outer diameter of the first tube portion 221 to form a first shoulder 223. The first tube portion 221 has a large diameter section 221a connecting with the first shoulder 223 and a small diameter section 221b having an outer diameter smaller than an outer diameter of the large diameter section 221a. The first stopping portion 222 connects with the first ferrule 21, is polygonal column, and is formed with a first tapered surface 222a at a distal end thereof away from the first tube portion 221. The base shell 23 has a mounting portion 231 in which the first holding member 22 is inserted, a coupling portion 232, and a positioning pin 233. The mounting portion 231 and the positioning pin 233 respectively protrude from opposite ends of the coupling portion 232, and the mounting portion 231 has an inner annular wall 231a and an outer annular wall 231b encircling the inner annular wall 231a and spaced apart from the inner annular wall 231a. A top portion of the outer annular wall 231b is formed with a guide protruding rib 231c, and both side portions of the outer annular wall 231b each are respectively formed with a positional limiting block 231d. The small diameter section 221b of the first tube portion 221 is inserted into a space surrounded by the inner annular wall 231a. The elastic piece 24 is provided in the mounting portion 231 and abuts against the first holding member 22. In the embodiment, the elastic piece 24 is a spring, and is sheathed on the inner annular wall 231a, both ends of the elastic piece 24 respectively abut against the first shoulder 223 and the coupling portion 232. The sheathing shell 25 is sheathed on the mounting portion 231 and covers the first holding member 22 and makes a part of the first ferrule 21 protrude from one end of the sheathing shell 25. The sheathing shell 25 has a sheathing tube portion 251, an elastic arm 252 connected to a top side of the sheathing tube portion 251, and two positioning blocks 253 respectively protruding from both sides of the elastic arm 252. The sheathing tube portion 251 is formed with a guide groove 251a cooperating with the guide protruding rib 231c and penetrating grooves 251b positioned on both sides and respectively engaging with the two positional limiting blocks 231d, when the sheathing tube portion 251 is sheathed on the mounting portion 231, the guide groove 251a receives the guide protruding rib 231c, and the two penetrating grooves 251b respectively receive the two positional limiting blocks 231d, thereby the sheathing tube portion 251 the mounting portion 231 are connected and fixed.

In the embodiment, the optical fiber connector 1 also comprises a coupling seat 11, a jacket 12, a clamping piece 13, a pull tab 14 and a shaft 15. The coupling seat 11 has two mounting grooves 111 to allow the positioning pins 233 of the two optical fiber plugs 2 to respectively insert and be fixed. The jacket 12 is connected to the coupling seat 11 and is communicated with the mounting grooves 111 to pass through and fix optical fiber wires 7. The optical fiber wire 7 comprises an optical fiber 71 and a protective layer 72 covering the optical fiber 71, in which an end of the optical fiber 71 exposes out of the protective layer 72 to insert in the first ferrule 21. The clamping piece 13 has a clamping portion 131 clamping the coupling portions 232 of the base shells 23 of the two optical fiber plugs 2 and a force exerting portion 132 connected to a top side of the clamping portion 131, in addition, the coupling portion 232 is formed with a encircling recessed groove 232a, a corresponding positioning rib 131a is formed to an inner side of the clamping portion 131 to latch with the recessed groove 232a, so as to prevent the clamping piece 13 from sliding with respect to the base shell 23. The force exerting portion 132 is wedge-shaped and provided with a shaft receiving hole 132a at a top away from the clamping portion 131 to receive the shaft 15. The pull tab 14 has a abutting portion 141 which is wedge-shaped and a pulling portion 142 extending from the abutting portion 141, and the abutting portion 141 is formed with shaft through holes 143 at positions corresponding to the shaft receiving holes 132a of the force exerting portion 132 to allow both ends of the shaft 15 to insert and allow the pull tab 14 to be pivoted on the force exerting portion 132. An end of the abutting portion 141 opposite to the pulling portion 142 is connected to distal ends of the elastic arm 252 of the two optical fiber plugs 2, and the abutting portion 141 has a receiving groove 141a receiving the force exerting portion 132. When the pulling portion 142 is upwardly pulled, the abutting portion 141 can be moved downwardly by using the shaft 15 as a fulcrum and press downwardly the elastic arm 252. In a varied embodiment, each optical fiber plug 2 may also be independent, and is inserted into the optical fiber receptacle 4 respectively. In the embodiment, the optical fiber connector 1 can facilitate operation of inserting and pulling out of the two optical fiber plugs 2.

Figure 7:
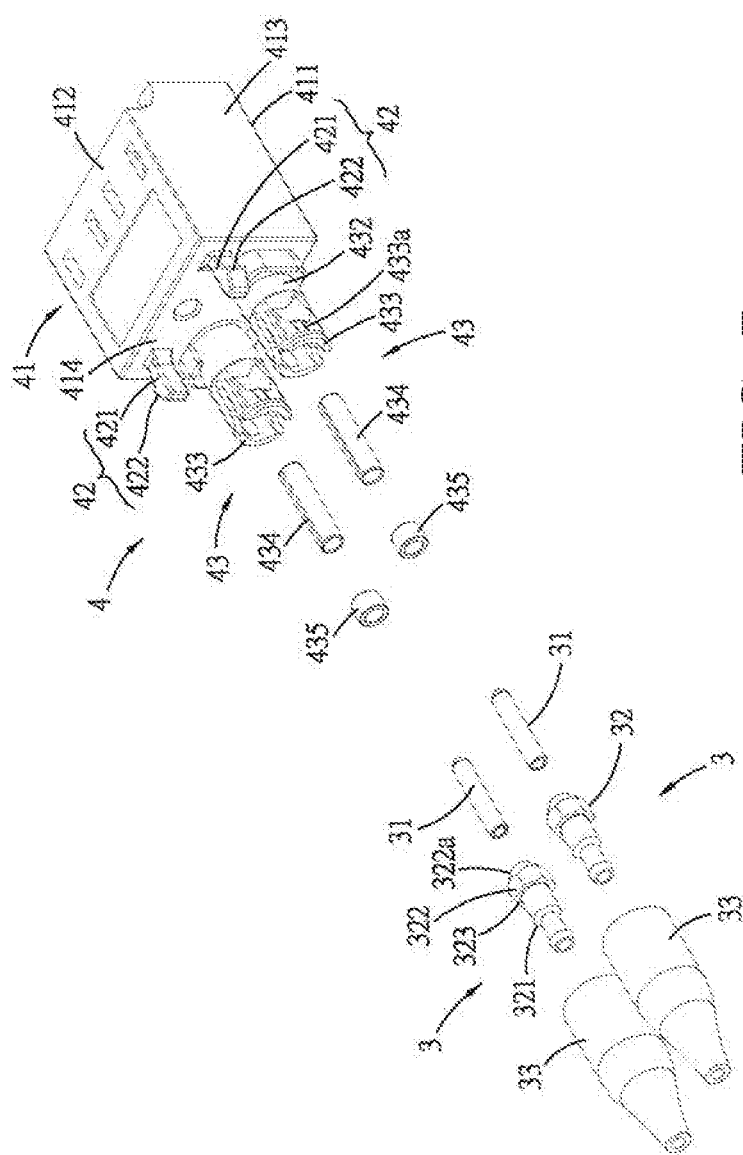
FIG. 7 is an enlarged view of an optical fiber receptacle and an optical fiber joint of the embodiment in FIG. 4.
Figure 8:
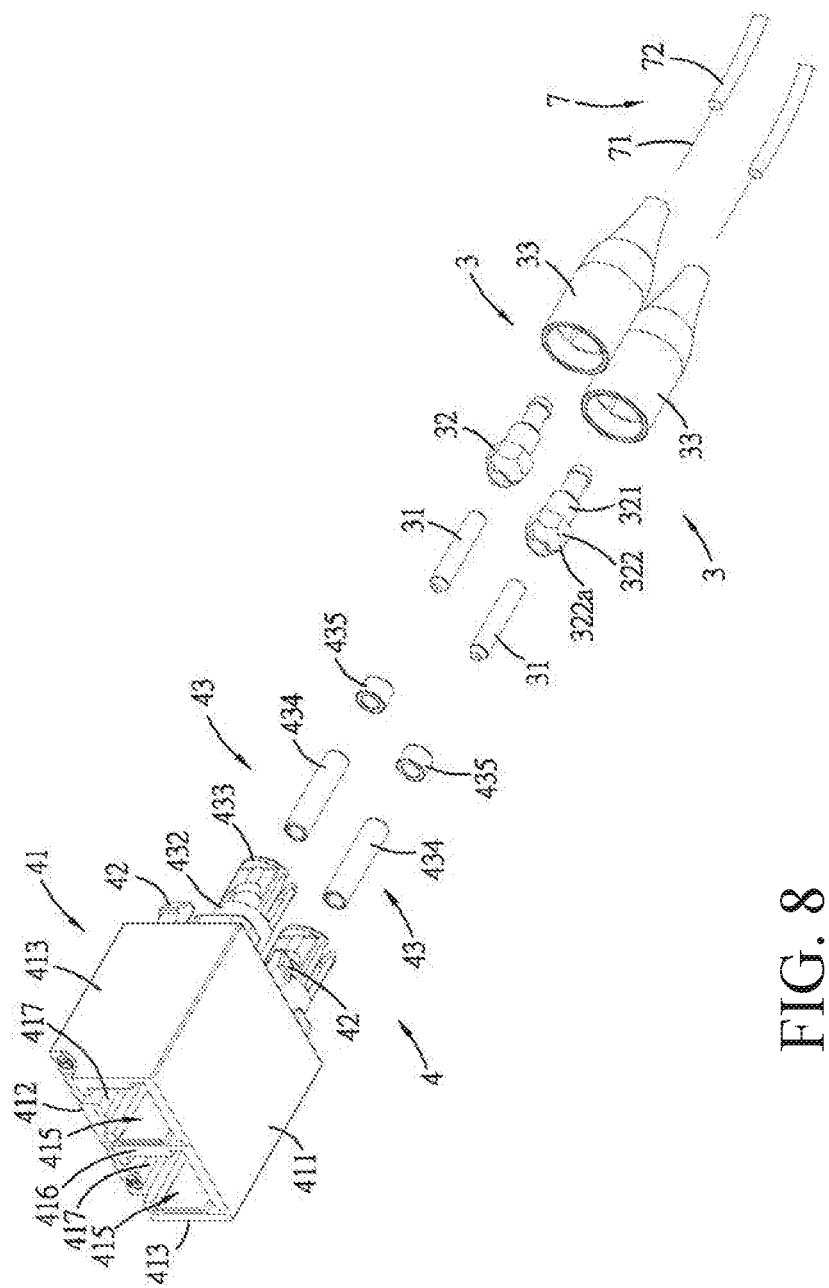
FIG. 8 is a view of FIG. 7 from another angle.
Figure 9:
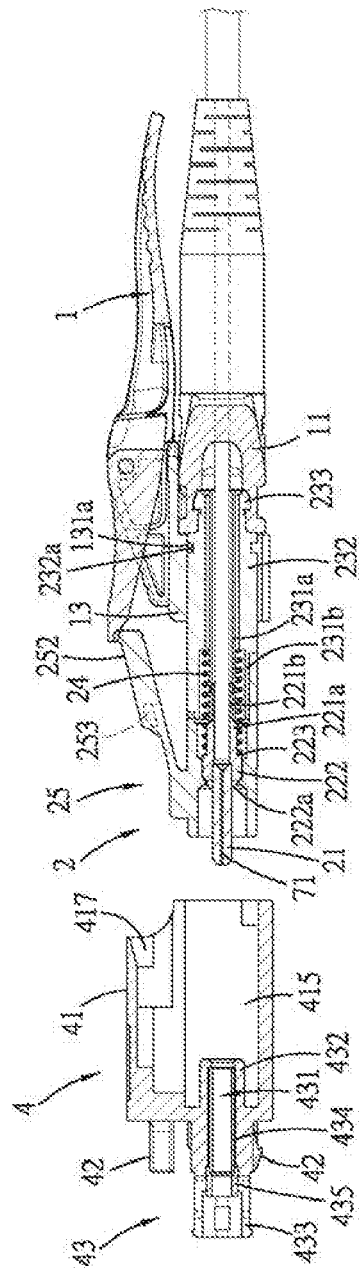
FIG. 9 is an exploded sectional view illustrating a mating relationship between the optical fiber connector and the optical fiber receptacle.
Figure 10:
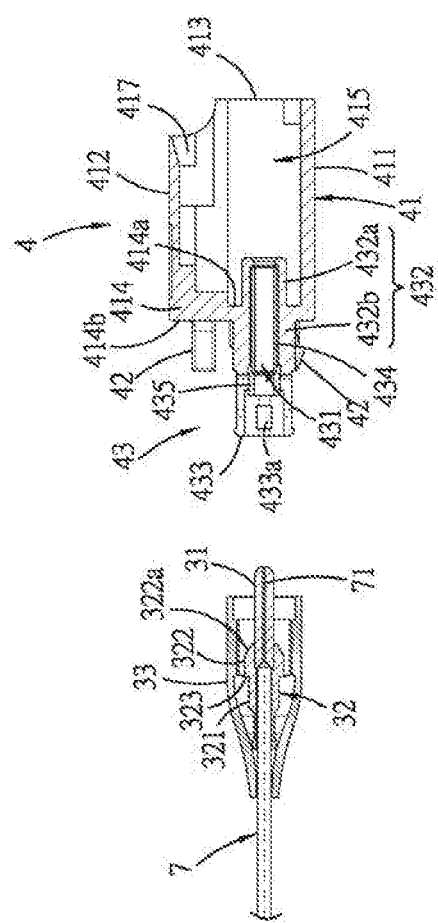
FIG. 10 is an exploded sectional view illustrating a mating relationship between the optical fiber joint and the optical fiber receptacle.

Referring to FIG. 7, FIG. 8 and FIG. 10, each optical fiber joint 3 comprises a second ferrule 31, a second holding member 32 holding the second ferrule 31, and a sheath 33. In the embodiment, the second holding member 32 has the same structure as the first holding member 22, the second holding member 32 is hollow tubular and has a second tube portion 321 and a second stopping portion 322 connected to one end of the second tube portion 321, and an outer diameter of the second stopping portion 322 at a connecting position between the second stopping portion 322 and the second tube portion 321 is larger than an outer diameter of the second tube portion 321 to form a second shoulder 323, the second stopping portion 322 connects with the second ferrule 31, is polygonal column, and is formed with a second tapered surface 322a at a position away from a distal end of the second tube portion 321. The sheath 33 surrounds and covers the second holding member 32 and a part of the second ferrule 31. Each optical fiber joint 3 is used to connect with an optical fiber wire 7. The optical fiber wire 7 comprises an optical fiber 71 and a protective layer 72 covering optical fiber 71, in which an end of the optical fiber 71 exposes out of the protective layer 72 to insert in the second ferrule 31.

Referring to FIG. 7 through FIG. 10, the optical fiber receptacle 4 comprises a housing 41, a plurality of positioning hooks 42 and two clamping units 43. The housing 41 has a bottom wall 411, a top wall 412 spaced apart from and facing the bottom wall 411, two side walls 413 spaced apart from and facing each other and respectively connected to both sides of the bottom wall 411 and the top wall 412, a rear wall 414 connected to rear ends of the bottom wall 411, the top wall 412 and the two side walls 413, and two slots 415 opened on an opposite side (that is a front side) of the rear wall 414, the two slots 415 allow the optical fiber plugs 2 to respectively insert in. The rear wall 414 has an inner surface 414a facing the slot 415 and an outer surface 414b opposite to the inner surface 414a. In the embodiment, the housing 41 also has a middle wall 416 between the two side walls 413 and connecting with the bottom wall 411 and the top wall 412 to define the two slots 415 with the bottom wall 411, the top wall 412, the two side walls 413 and the rear wall 414 together. Inner sides of the two side walls 413 and both sides of the middle wall 416 each are formed with a stopper 417 to allow to latch with the positioning block 253 (see FIG. 5) of the optical fiber plug 2. When the optical fiber plug 2 enters into the slot 415, the elastic arm 252 can be compressed to elastically move downwardly and then make the positioning block 253 move downwardly to pass the stopper 417, after the positioning block 253 passes the stopper 417, the elastic arm 252 returns to a normal position, and make the positioning block 253 abut against the stopper 417 to prevent the optical fiber plug 2 from exiting from the slot 415. When the optical fiber plug 2 is detached, the pulling portion 142 of the pull tab 14 is pulled to press downwardly the elastic arms 252 of the two optical fiber plugs 2, thereby the positioning block 253 moves downwardly to be able to pass the stopper 417, and then the optical fiber connector 1 is pulled towards a direction of exiting from the slot 415, the two optical fiber plugs 2 can be moved out of the corresponding slots 415 together.

Each positioning hook 42 has an elastic post 421 protruding from the outer surface 414b of the rear wall 414 in a column shape and a hook portion 422 formed to the elastic post 421. The two clamping units 43 are formed to the rear wall 414 respectively corresponding to the two slots 415, and respectively clamp the two corresponding optical fiber joints 3. Each clamping unit 43 comprises a clamping channel 431 penetrating the rear wall 414 and communicated with the corresponding slot 415, a tubular body 432 and a pair of clamping arms 433. The tubular body 432 has an inner tube section 432a protruding from the inner surface 414a of the rear wall 414 and extending into the slot 415 and an outer tube section 432b protruding from the outer surface 414b of the rear wall 414. The pair of clamping arms 433 extend from a distal end of the outer tube section 432b, and each clamping arm 433 has a latching hole 433a. The clamping unit 43 also comprises a sleeve 434 provided in the tubular body 432, and a stopper portion 435 provided in the clamping channel 431 and between the pair of clamping arms 433 and the outer tube section 432b. In the embodiment, the stopper portion 435 is a hollow annular block.

Figure 11:
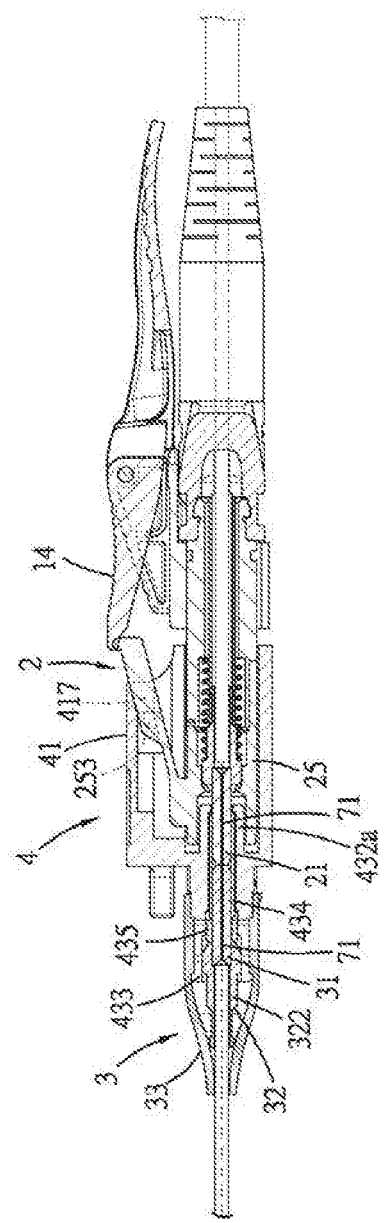
FIG. 11 is a cross-sectional view illustrating an assembled connection relationship among the optical fiber receptacle, the optical fiber joint and the optical fiber plug of the embodiment.
Figure 12:
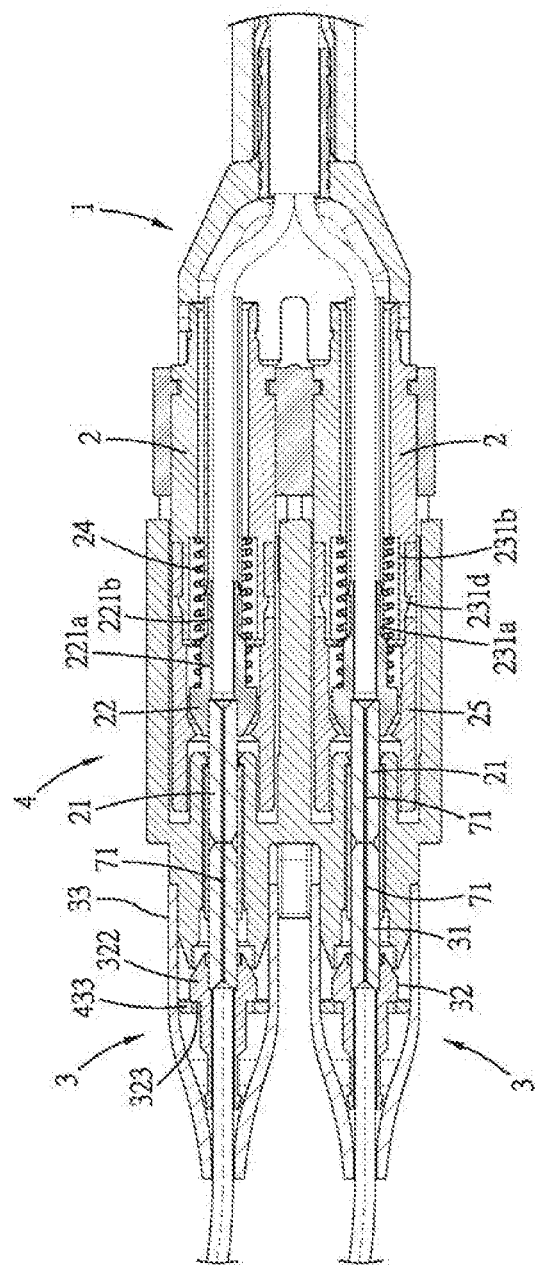
FIG. 12 is a cross-sectional view from another angle illustrating an assembled connection relationship among the optical fiber receptacle, the optical fiber joint and the optical fiber plug of the embodiment.
Figure 13:
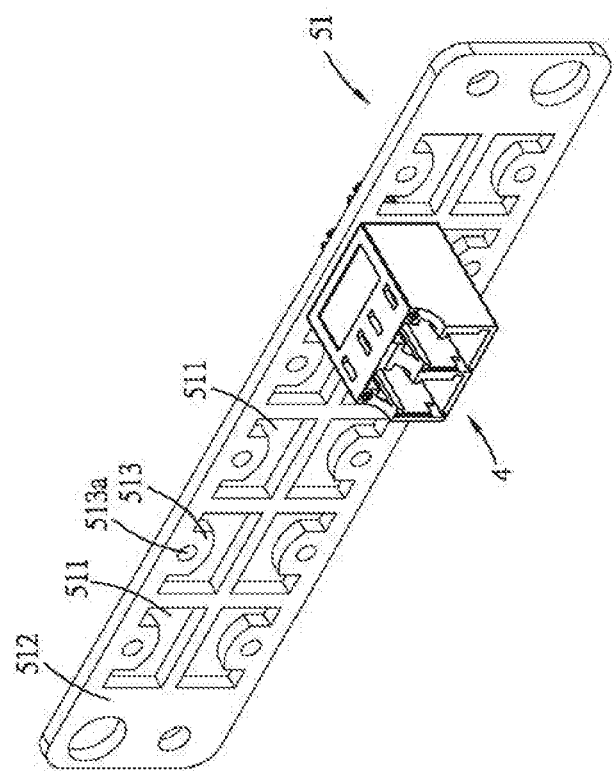
FIG. 13 is a perspective view illustrating that the optical fiber receptacle is mounted to the panel of the embodiment.
Figure 14:
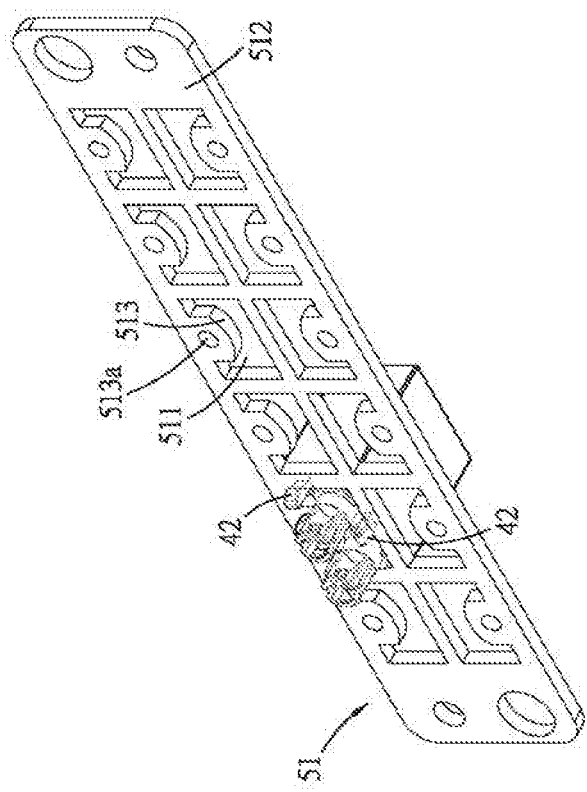
FIG. 14 is a view of FIG. 13 from another angle.
Figure 15:
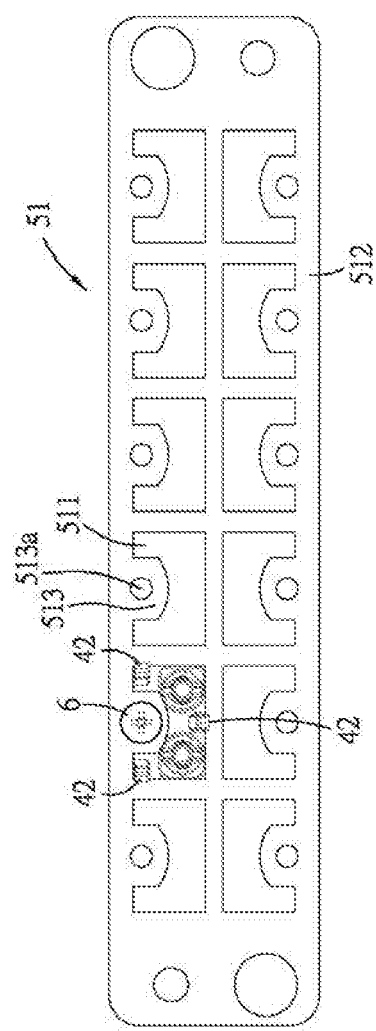
FIG. 15 is a rear view of FIG. 13.
Figure 16:
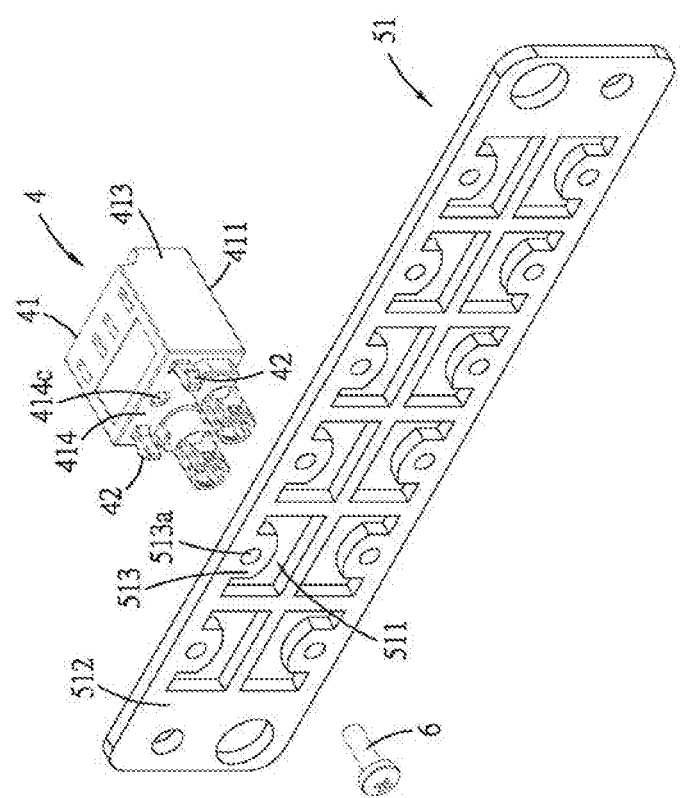
FIG. 16 is an exploded perspective view illustrating that the optical fiber receptacle is mounted to the panel of the embodiment.
Figure 17:
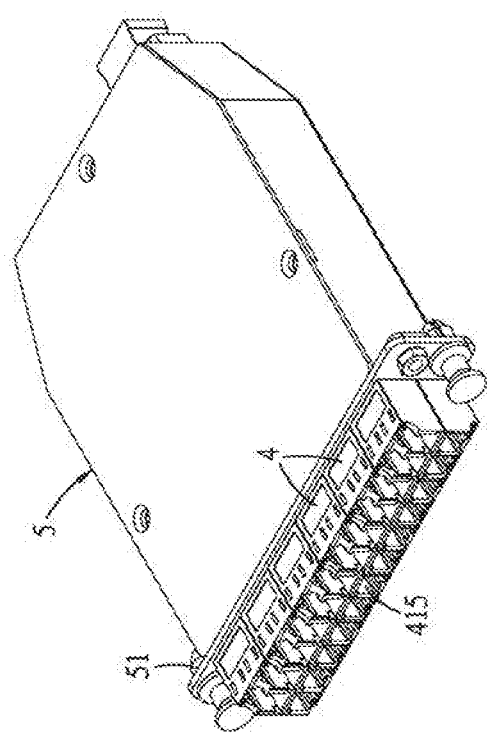
FIG. 17 is a perspective view of an embodiment of an optical fiber receptacle module of the present disclosure.
Figure 18:
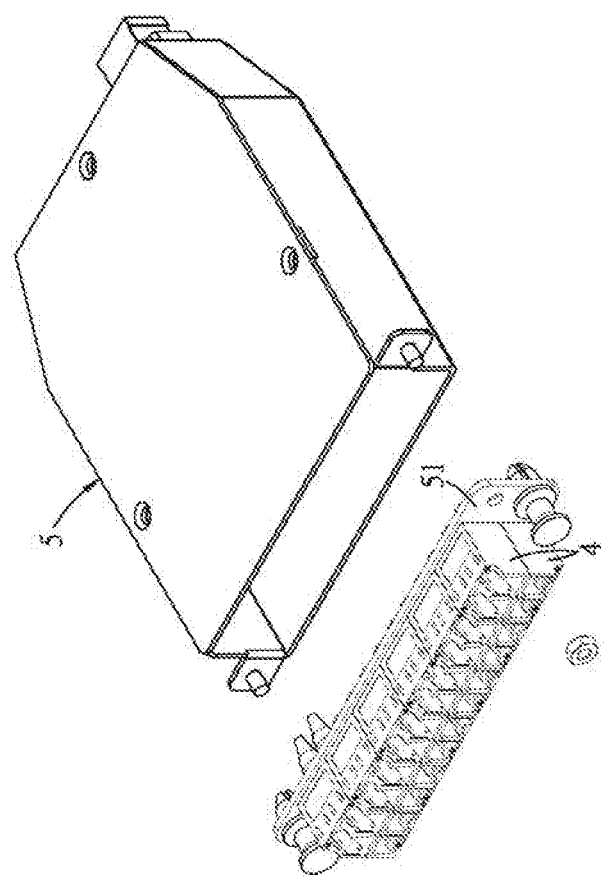
FIG. 18 is an exploded perspective view of FIG. 17.
Figure 19:
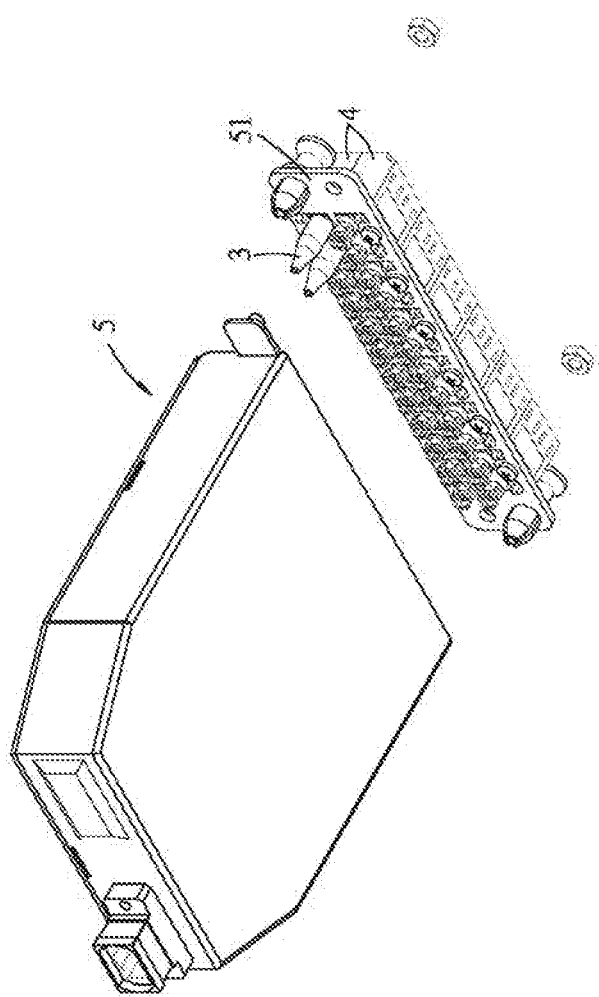
FIG. 19 is a view of FIG. 18 from another angle.

Also referring to FIG. 11 and FIG. 12, the sleeve 434 is used for insertion of the first ferrule 21 and the second ferrule 31 and aligning the first ferrule 21 and the second ferrule 31 with each other, the stopper portion 435 is used to limit a position that the second ferrule 31 extends into the housing 41. Specifically, when the optical fiber joint 3 is connected with the optical fiber receptacle 4, the second ferrule 31 passes through the stopper portion 435 and extends into the sleeve 434, the second stopping portion 322 of the second holding member 32 first enters between the two clamping arms 433 by the second tapered surface 322a, so that distal ends of the two clamping arms 433 are elastically pushed open along the second tapered surface 322a, until the second stopping portion 322 completely enters between the two clamping arms 433, a distal end of the second stopping portion 322 abuts against the stopper portion 435, and two corners of the second stopping portion 322 positioned on opposite sides respectively extend into the two latching holes 433a, so that the second shoulder 323 respectively abuts against inner edges defining the latching holes 433a of the pair of clamping arms 433 at the two corners, thereby the two clamping arms 433 clamp and fix the second holding member 32, so that the second holding member 32 cannot be withdrawn in an opposite direction. And when the optical fiber joint 3 is connected with the optical fiber receptacle 4, the sheath 33 further covers the pair of clamping arms 433. When the optical fiber joint 3 and the optical fiber plug 2 are inserted into the optical fiber receptacle 4 together, the optical fiber plug 2 enters into the slot 415 and a front end of the sheathing shell 25 mates with the inner tube section 432a, and the first ferrule 21 is inserted into the sleeve 434 with respect to the second ferrule 31, that is, the first ferrule 21 and the second ferrule 31 are respectively inserted into the sleeve 434 from both ends of the sleeve 434, and connected together in the sleeve 434, the first ferrule 21 and the second ferrule 31 are aligned with each other by the sleeve 434 and connected in the corresponding clamping channel 431, that is, the optical fibers 71 in the first ferrule 21 and the second ferrule 31 can be accurately connected to each other to make the optical signal can be transferred smoothly.

Referring to FIG. 13 to FIG. 16, the optical fiber receptacle 4 is mounted on a panel 51 having a mounting hole 511. In the embodiment, the panel 51 is formed with a plurality of mounting holes 511 arranged in a matrix, and the panel 51 has a main body portion 512 and a plurality of tab portions 513 respectively protruding from the main body portion 512 into the mounting holes 511, each tab portion 513 is provided with a through hole 513a. The positioning hook 42 of the optical fiber receptacle 4 is used to pass through one mounting hole 511 of the panel 51 to latch with a hole edge defining the mounting hole 511 of the panel 51. In the embodiment, the optical fiber receptacle 4 totally has three positioning hooks 42, and the three positioning hooks 42 respectively latch with hole edges on three sides defining the mounting hole 511, and interpose the panel 51 with the rear wall 414, and so that the optical fiber receptacle 4 can be securely fixed on the panel 51. In addition, a screw hole 414c is formed to the rear wall 414 of the housing 41 of the optical fiber receptacle 4 to correspond to the through hole 513a of the corresponding tab portion 513, a screw locking piece 6 screws with the screw hole 414c after passing through the through hole 513a, thereby further increasing stability of combination of the optical fiber receptacle 4 with the panel 51.

The optical fiber receptacle 4 cooperating with the optical fiber joint 3 may make the housing 41 of the optical fiber receptacle 4 only be provided with the slot 415 on one side to receive the optical fiber plug 2, while the structure forming the slot 415 on another side is replaced by the clamping unit 43. Compared to the structure of the receptacle with the slots on opposite sides, the structure of the optical fiber receptacle 4 of the embodiment can be reduced almost by half, and the volume can be reduced, and the material costs can be reduced greatly. And the components of the optical fiber joint 3 can be greatly reduced compared to the optical fiber plug 2, thereby not only saving the material costs, but also reducing the manufacturing hours.

It can be understood that in a varied embodiment, the optical fiber receptacle 4 also may only have one slot 415 and be provided with one clamping unit 43 for connection between one optical fiber joint 3 and one optical fiber plug 2. Or the optical fiber receptacle 4 has more than two slots 415, certainly the number of the clamping units 43 is correspondingly adjusted according to the number of the slots 415, the present disclosure is not limited to the embodiment.

Referring to FIG. 16 to FIG. 19, an embodiment of an optical fiber receptacle module of the present disclosure comprises an outer shell 5 and a plurality of optical fiber receptacles 4 as above mentioned. The outer shell 5 comprises a panel 51 as above mentioned. The optical fiber receptacles 4 are provided to the panel 51 respectively corresponding to the mounting holes 511. The positioning hook 42 of each optical fiber receptacle 4 passes through the corresponding mounting hole 511 and latches with the hole edge defining the mounting hole 511 of the panel 51, that is, the positioning hook 42 latches with a periphery of a rear surface of the panel 51 surrounding the mounting hole 511, and the outer surface 414b of the rear wall 414 abuts against a front surface of the panel 51, and so that the optical fiber receptacle 4 is fixed on the panel 51. Furthermore, the outer surface 414b of the rear wall 414 faces towards an inside of the outer shell 5, therefore, the optical fiber joint 3 can be positioned inside the outer shell 5 and protected by the outer shell 5 after the optical fiber joint 3 is inserted in the optical fiber receptacle 4. And the housing 41 is positioned outside the outer shell 5 for the optical fiber plug 2 (see FIG. 12) to be inserted into the slot 415. Outer side faces of the bottom wall 411 and the two side walls 413 of the housing 41 of each optical fiber receptacle 4 all are flat surfaces, and so that the housings 41 of the adjacent optical fiber receptacles 4 are provided close to each other. In the embodiment, the optical fiber receptacles 4 are arranged in two rows, that is an upper row a lower row, and the optical fiber receptacles 4 in the upper row and the optical fiber receptacles 4 in the lower row are adjacent to each other by the bottom walls 411, while the optical fiber receptacles 4 in the same row are adjacent to each other by the side walls 413, so that the optical fiber receptacles 4 can be densely arranged to greatly reduce a whole area of them occupying the panel 51, so as to increase the number of the optical fiber receptacles 4 which can be provided on the panel 51, that is, more optical fiber joints 3 can be inserted, so that the optical fiber receptacle module can accommodate more optical fiber wires 7, so that the number of signals that can transmitted by the optical fiber receptacle module is increased, and then the number of data center cabinets for providing the optical fiber receptacle module can be reduced.

The above described are only the embodiments of the present disclosure, which cannot limit the scope of the implementation of the present disclosure, that is, simple equivalent variations and modifications made according to the scope of the claims and the description content of the present disclosure are still fallen within the scope of the present disclosure.

What is claimed is:

1. An optical fiber connection device, comprising:
   at least one optical fiber plug, the optical fiber plug comprising a first ferrule, a first holding member holding the first ferrule, a base shell to which the first holding member is provided, an elastic piece provided to the base shell and abutting against the first holding member, and a sheathing shell sheathed on the base shell and covering the first holding member and making a part of the first ferrule protrude from the sheathing shell;
   at least one optical fiber joint, the optical fiber joint comprising a second ferrule and a second holding member holding the second ferrule; and
   an optical fiber receptacle comprising
      a housing having a bottom wall, a top wall spaced apart from and facing the bottom wall, two side walls spaced apart from and facing each other and respectively connected to both sides of the bottom wall and the top wall, a rear wall connected to rear ends of the bottom wall, the top wall and the two side walls, and at least one slot opened on an opposite side of the rear wall, the rear wall having an inner surface facing the at least one slot and an outer surface opposite to the inner surface, the at least one slot being used to be inserted by the at least one optical fiber plug respectively;
      a plurality of positioning hooks, each positioning hook having an elastic post protruding from the outer surface of the rear wall in a column shape and a hook portion formed to the elastic post, the positioning hook being used to pass through a mounting hole of a panel to latch with a hole edge defining the mounting hole of the panel; and
      at least one clamping unit formed to the rear wall corresponding to the at least one slot and correspondingly clamping the second holding member of the at least one optical fiber joint, and the clamping unit comprising a clamping channel penetrating the rear wall and communicated with the corresponding slot;
      the first ferrule and the second ferrule being connected relative to each other in the corresponding clamping channel.

2. The optical fiber connection device of claim 1, wherein the clamping unit further comprises a tubular body and a pair of clamping arms,
   the tubular body has an inner tube section protruding from the inner surface of the rear wall and extending into the slot and an outer tube section protruding from the outer surface of the rear wall,
   the pair of clamping arms extend from a distal end of the outer tube section, and each clamping arm has a latching hole.

3. The optical fiber connection device of claim 2, wherein the clamping unit further comprises a sleeve provided in the tubular body to allow the first ferrule and the second ferrule to insert in and allow the first ferrule and the second ferrule to align with each other.

4. The optical fiber connection device of claim 2, wherein the clamping unit further comprises a stopper portion provided in the clamping channel and between the pair of clamping arms and the outer tube section, the stopper portion is used to limit a position that the second ferrule extends into the housing.

5. The optical fiber connection device of claim 4, wherein the stopper portion is a hollow annular block.

6. The optical fiber connection device of claim 2, wherein the second holding member is hollow tubular and has a second tube portion and a second stopping portion connected to one end of the second tube portion, and an outer diameter of the second stopping portion at a connecting position between the second stopping portion and the second tube portion is larger than an outer diameter of the second tube portion to form a second shoulder, the second stopping portion connects with the second ferrule, the second shoulder abuts against inner edges defining the latching holes of the corresponding pair of clamping arms.

7. The optical fiber connection device of claim 6, wherein the second stopping portion is polygonal column, and the second shoulder abuts against the inner edges defining the latching holes of the pair of clamping arms respectively at two corners of the second stopping portion.

8. The optical fiber connection device of claim 6, wherein the second stopping portion is formed with a second tapered surface at a position away from a distal end of the second tube portion.

9. The optical fiber connection device of claim 2, wherein the optical fiber joint further comprises a sheath surrounding and covering the second holding member and a part of the second ferrule.

10. The optical fiber connection device of claim 9, wherein the sheath further covers the pair of clamping arms.

11. The optical fiber connection device of claim 1, wherein the base shell has a mounting portion in which the first holding member is inserted, the elastic piece is provided in the mounting portion and abuts against the first holding member, the sheathing shell is sheathed on the mounting portion and covers the first holding member and makes a part of the first ferrule protrude from one end of the sheathing shell.

12. An optical fiber receptacle module, comprising:

an outer shell comprising a panel, the panel being formed with a plurality of mounting holes arranged in a matrix; and a plurality of the optical fiber receptacles of claim 1 mounted to the panel respectively corresponding to the mounting holes, outer side faces of the bottom wall and the two side walls of the housing of the each optical fiber receptacle all being flat surfaces, and so that the housings of the adjacent optical fiber receptacle being provided close to each other, the positioning hook of each optical fiber receptacle passing through the corresponding mounting hole and latching with a hole edge defining the mounting hole of the panel, and so that the outer surface of the rear wall facing towards an inside of the outer shell.

13. The optical fiber receptacle module of claim 12, wherein the panel has a main body portion and a plurality of tab portions respectively protruding from the main body portion into the mounting holes, each tab portion is provided with a through hole, a screw hole is formed to the rear wall of the housing of each optical fiber receptacle to correspond to the through hole of the corresponding tab portion, a screw locking piece screws with the screw hole after passing through the through hole.

* * * * *